(12) United States Patent
Girvin et al.

(10) Patent No.: US 7,042,357 B2
(45) Date of Patent: May 9, 2006

(54) NON-REUSABLE IDENTIFICATION DEVICE

(75) Inventors: Joshua M. Girvin, Princeton, NJ (US);
John W. Lerch, Princeton, NJ (US)

(73) Assignee: Proximities, Inc., Melborne, FL (US)

( * ) Notice: Subject to any disclaimer, the term of this patent is extended or adjusted under 35 U.S.C. 154(b) by 59 days.

(21) Appl. No.: 10/400,049

(22) Filed: Mar. 26, 2003

(65) Prior Publication Data

US 2004/0189470 A1 Sep. 30, 2004

(51) Int. Cl.
G08B 13/14 (2006.01)

(52) U.S. Cl. ............... 340/568.2; 340/572.7; 340/572.8; 340/572.9

(58) Field of Classification Search ............ 340/572.1, 340/572.8, 572.9, 573.4, 568.2, 568.4; 292/307 R; 40/633; 235/491
See application file for complete search history.

(56) References Cited

U.S. PATENT DOCUMENTS

| | | | |
|---|---|---|---|
| 4,736,196 A * | 4/1988 | McMahon et al. ....... | 340/573.4 |
| 4,800,543 A | 1/1989 | Lydon-James et al. | |
| 4,833,807 A | 5/1989 | McLean | |
| 4,835,372 A | 5/1989 | Gombrich et al. | |
| 4,885,571 A * | 12/1989 | Pauley et al. ............ | 340/573.4 |
| 4,973,944 A | 11/1990 | Maletta ................... | 340/568.1 |
| 4,980,671 A | 12/1990 | McCurdy ................ | 340/568.1 |
| 5,364,133 A | 11/1994 | Hofer et al. | |
| 5,374,921 A | 12/1994 | Martin et al. | |
| 5,423,574 A | 6/1995 | Forte-Pathroff | |
| 5,430,441 A | 7/1995 | Bickley et al. | |
| 5,448,846 A | 9/1995 | Peterson et al. | |
| 5,457,906 A | 10/1995 | Mosher, Jr. | |
| 5,471,197 A | 11/1995 | McCurdy et al. | |
| 5,504,474 A * | 4/1996 | Libman et al. .......... | 340/573.4 |
| 5,512,879 A * | 4/1996 | Stokes ..................... | 340/573.4 |
| 5,612,675 A | 3/1997 | Jennings et al. ......... | 340/573.1 |
| 5,627,520 A * | 5/1997 | Grubbs et al. ........... | 340/572.1 |
| 5,781,442 A | 7/1998 | Engleson et al. | |
| 5,831,535 A * | 11/1998 | Reisman et al. ......... | 340/573.4 |
| 5,883,576 A * | 3/1999 | De La Huerga ......... | 340/573.1 |
| 5,973,598 A | 10/1999 | Beigel ..................... | 340/572.1 |
| 5,973,600 A | 10/1999 | Mosher, Jr. .............. | 340/572.8 |
| 5,977,877 A * | 11/1999 | McCulloch et al. ..... | 340/572.8 |
| 5,979,941 A * | 11/1999 | Mosher et al. ............... | 283/67 |
| 6,021,494 A | 2/2000 | Bolan et al. | |
| 6,043,746 A * | 3/2000 | Sorrells ................... | 340/572.7 |
| 6,050,622 A * | 4/2000 | Gustafson ............... | 292/307 R |
| 6,055,756 A * | 5/2000 | Aoki .......................... | 40/633 |
| 6,072,396 A | 6/2000 | Gaukel | |
| 6,104,295 A * | 8/2000 | Gaisser et al. .......... | 340/573.4 |
| 6,107,920 A | 8/2000 | Eberhardt et al. | |

(Continued)

Primary Examiner—Benjamin C. Lee
(74) Attorney, Agent, or Firm—Hamilton, Brook, Smith & Reynolds, P.C.

(57) ABSTRACT

An identification device has a band and a non-reusable tamper-resistant fastening arranged to join opposite end regions of the band to fasten it around a limb of a user. A transponder circuit is attached to the band, and is responsive to a received wireless signal. In response to the received wireless signal, the transponder emits a wireless signal representative of information pre-stored in the transponder. An electrically conductive continuous loop on the band extends from the transponder and forms an electrically continuous path along substantially the entire length of the band, the loop being frangible and easily broken in response to an attempt to remove the band from the wearer's limb. Circuitry in the transponder is electrically connected to the loop and arranged to become inoperative and disable the transponder if the loop is broken.

13 Claims, 1 Drawing Sheet

U.S. PATENT DOCUMENTS

| | | |
|---|---|---|
| 6,142,368 A | 11/2000 | Mullins et al. |
| 6,144,303 A | 11/2000 | Federman ................ 340/573.4 |
| 6,219,789 B1 | 4/2001 | Little et al. |
| 6,255,951 B1 | 7/2001 | De La Huerga |
| 6,335,907 B1 | 1/2002 | Momich et al. |
| 6,346,886 B1 | 2/2002 | De La Huerga |
| 6,349,493 B1 | 2/2002 | Newman et al. |
| 6,352,045 B1 | 3/2002 | Takashima |
| 6,352,205 B1 | 3/2002 | Mullins et al. |
| 6,384,727 B1 | 5/2002 | Diprizio et al. |
| 6,421,013 B1 | 7/2002 | Chung |
| 6,424,623 B1 | 7/2002 | Borgstahl et al. |
| 6,431,455 B1 | 8/2002 | Ponert |
| 6,434,158 B1 | 8/2002 | Harris et al. |
| 6,434,159 B1 | 8/2002 | Woodward et al. |
| 6,472,989 B1 | 10/2002 | Roy, Jr. ................... 340/573.4 |
| 6,474,557 B1 | 11/2002 | Mullins et al. ........ 235/472.03 |
| 6,483,427 B1 | 11/2002 | Werb |
| 6,663,006 B1 | 12/2003 | Mullins et al. |
| 6,693,543 B1 * | 2/2004 | Stephenson et al. ..... 340/572.9 |
| 6,744,367 B1 * | 6/2004 | Forster .................... 340/572.7 |
| 6,772,546 B1 * | 8/2004 | Latschbacher et al. ... 40/299.01 |
| 6,782,648 B1 * | 8/2004 | Mosher, Jr. .................. 40/633 |
| 2002/0003477 A1 | 1/2002 | Roy, Jr. |
| 2002/0007292 A1 | 1/2002 | Paxton et al. |
| 2002/0049656 A1 | 4/2002 | Lancos et al. |
| 2002/0067264 A1 | 6/2002 | Soehnlen |
| 2002/0070865 A1 | 6/2002 | Lancos et al. |
| 2002/0082897 A1 | 6/2002 | Menelly et al. |
| 2002/0084904 A1 | 7/2002 | De La Huerga |
| 2003/0075608 A1 | 4/2003 | Atherton |
| 2003/0173408 A1 | 9/2003 | Mosher, Jr. et al. |
| 2004/0066296 A1 | 4/2004 | Atherton |

* cited by examiner

NON-REUSABLE IDENTIFICATION DEVICE

FIELD OF THE INVENTION

The present invention deals with a non-reusable identification device for attachment to a body part or to an article of apparel of a wearer and that prevents the wearer from being able to re-use the device once it has been separated from the body part or article of apparel.

BACKGROUND OF THE INVENTION

Disposable bracelets have been used for such things as identification, purchasing goods, and age verification for a number of years. For example, disposable radio-frequency identification (RFID) bracelets are used in water parks and theme parks to quickly and uniquely identify patrons. Unique identification of patrons can be used to control access to restricted areas or limit access to certain rides or attractions. For example, a patron of legal drinking age could purchase a bracelet that indicates that the patron is of legal age and grants the patron access to restricted areas such as beer sales areas. RFID bracelets issued to minors would lack the identification codes that would permit their wearers from gaining access to such areas. As another example, children under a certain age could be issued bracelets with codes that prevent them from gaining access to rides or amusements that are unsafe or otherwise inappropriate for young children. Such bracelets can also be used to locate the wearer, so that lost children can be easily located or so children can be prevented from leaving the amusement park unless accompanied by an authorized adult.

RFID bracelets can be used to allow the purchase of items without the exchange of currency or need for a credit/debit card, or to allow secure communication and monetary exchange among patrons (for example, a parent may authorize credit of funds to a child to allow a purchase up to a preselected amount). Upon entering a park or other venue, a patron can request that the bracelet issued to the patron or the patron's family members be credited for purchases up to a preselected amount. Purchases up to the preselected amount can then be made using the bracelet instead of using cash or credit/debit cards. The bracelet could also be coded so that a wearer would be prevented from making certain purchases, or from making a single purchase above a chosen limit, so that children, for example, are encouraged to spend their allotted funds wisely.

Bracelets of the type described are most often made to be disposable, so that they are inexpensive to produce and easy to use. However, such bracelets are susceptible to misuse and unauthorized use. Some bracelets are easy to remove, yet still function after removal. A bracelet that still functions after it has been removed provides the opportunity for patrons to exchange bracelets. This could provide patrons with the opportunity to give access to a restricted area to an unauthorized patron. A patron with an "adult" bracelet that would allow access to beer sales, for example, could remove and give or sell that bracelet to a patron not of legal drinking age. As another example, a thoughtlessly discarded bracelet that still has funds credited to it could be retrieved and used by an unauthorized individual to purchase goods or services using someone else's account. A bracelet that is rendered non-functional after removal would destroy its value for transfer to another patron, and would safeguard against unauthorized use of bracelets.

A number of mechanical measures have been taken to prevent such bracelets from being transferred. Most prominent are the single-use locking button mechanism found on some plastic bracelets. An example of this approach is found in U.S. Pat. No. 5,973,600. Also known are adhesive locking mechanisms with slits that prevent the wearer from peeling the adhesive back and reattaching it. An example of that approach is found in U.S. Pat. No. 6,474,557. Those mechanisms render tampering with the locking device obvious to a visual inspection of the bracelet and, in most cases, render the bracelet unwearable after removal. However, tampering with the band portion of the bracelet is not prevented by those mechanisms, nor is the bracelet rendered otherwise inoperative if those mechanisms are tampered with. It is possible for the bracelet to be cut or torn, and reattached with a simple piece of transparent tape. To detect this sort of tampering, the person checking the bracelet would need to either make a full visual inspection of the bracelet or tug very firmly on the bracelet. This is slow, inconvenient, and impractical, especially when large numbers of people require identification. Furthermore, such a visual inspection is subject to human error, the most obvious being the failure of the bracelet checker to perform adequate inspection.

To enhance the capabilities of these bracelets, additional technologies such as bar codes and RFID have been integrated into the bracelets. The use of such technologies has made the process of identifying the bracelet wearer faster and more secure, resulting in an increased use of bracelets for identification purposes and for facilitating transactions. However, this can lead to complacency among those responsible for checking the bracelets, and has a tendency to reduce the likelihood that the person checking the bracelet wearer will perform an adequate visual or physical inspection. To date, disposable wristbands with added identification technologies have depended upon the previously described mechanical restrictions for transferability.

Special electronic bracelets that prevent transferability for ensuring that hospital patients or prisoners remain within a given proximity of their quarters are known. However, such designs are prohibitively bulky, expensive, and overly complex for use in high-volume applications with short-term use. For example, U.S. Pat. Nos. 5,471,197 and 5,374,921 disclose the use of fiber optics to ensure that the bracelet is not removed. U.S. Pat. No. 6,144,303 describes a capacitive coupling between the bracelet and the wearer's skin. When the capacitance changes, indicating bracelet removal, an alarm is tripped. The methods and devices disclosed in those patents are unnecessarily complex and prohibitively expensive for disposable use.

U.S. Pat. Nos. 4,973,944 and 4,980,671 describe bracelets with DC current paths that run around the bracelet and form a closed circuit when the ends of the bracelet are brought together. This method involves complications when one attempts to use it with conventional disposable bracelet designs because it requires a large metal contact area to enable size adjustment of the bracelet. It also does not necessarily solve the problem of tampering because such bracelets are designed to activate an alarm when removed, not necessarily to prevent reattachment. The metal to metal contact surfaces could be easily reattached on a limb of a different user.

SUMMARY OF THE INVENTION

The present invention encompasses an identification device comprising a band and a non-reusable tamper-resistant fastening arranged to join opposite end regions of the band to fasten it around a limb of a user. A transponder circuit is attached to the band, and is responsive to a received wireless signal. In response to the received wireless signal, the transponder emits a wireless signal representative of information pre-stored in the transponder. An electrically conductive continuous loop on the band extends from the transponder and forms an electrically continuous path along substantially the entire length of the band, the loop being frangible and easily broken in response to an attempt to remove the band from the wearer's limb. Circuitry in the transponder is electrically connected to the loop and arranged to become inoperative and disable the transponder if the loop is broken.

For ease of description, the invention will be described in terms of an RFID bracelet, but it should be understood that the device of the present invention is not limited to RFID or to a bracelet but extends to any device that can be attached to a limb or other body part of a wearer, or to an article of clothing and may include a necklace, an anklet, a belt, or the like.

DESCRIPTION OF THE PREFERRED EMBODIMENTS

Figure 1:
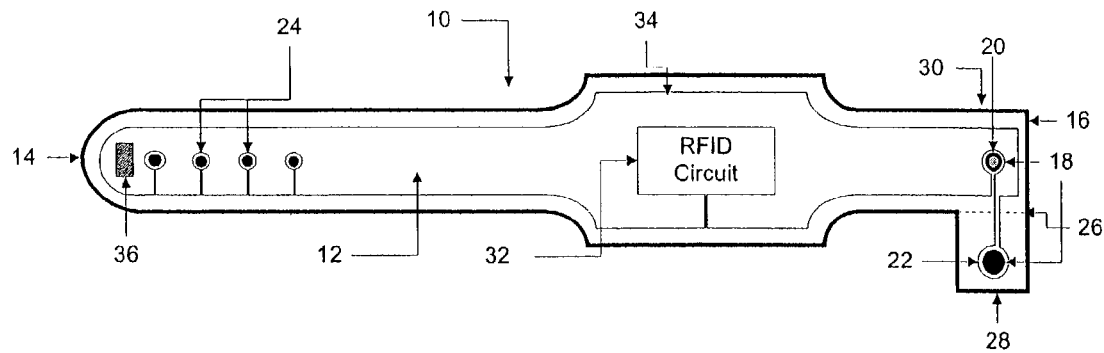
FIG. 1 is a schematic representation of one embodiment of the present invention.

Referring now to the drawings in detail, wherein like numerals indicate like elements throughout, there is shown in FIG. 1 one embodiment of the present invention. The invention comprises a bracelet 10 in the form of elongated band 12 with opposite ends 14, 16 that can be brought together and fastened to form a closed loop. Bracelet 10 comprises a mechanical non-reusable tamper-resistant locking mechanism 18 to fasten the opposite ends 14, 16 together and to prevent the user from attempting to open the locking mechanism 18 to remove the bracelet 10 without rendering those tampering efforts visually obvious. Locking mechanism 18 comprises a barbed peg 20 and a locking hole 22 in flap 28 at one end of said band and at least one adjustment opening or adjustment hole 24 at the opposite end of said band. Adjustment holes 24 can be used to adjust the bracelet 10 to conform to body parts of different circumferences. When ends 14, 16 are brought together, the barbed peg 20 is arranged to pass through a selected hole 24 as required for a snug fit. The flap 28 is then folded along imaginary line 26 and barbed peg 20 is then passed through locking hole 22. Peg 20 is shaped to resist removal from said hole 22 without also destroying the locking mechanism 18 and rendering it incapable of being refastened. Alternatively, or in addition, adjustment holes 24 can be designed to replace or supplement locking hole 22 by configuring them in such a way that attempts to remove the bracelet from the barbed peg 20 would also destroy the hole 24, thereby disabling the bracelet and rendering it incapable of being refastened.

Bracelet 10 also includes a transponder 32. Transponder 32 contains circuitry that responds to an RF interrogation signal and in response emits an RF signal representative of information pre-stored or pre-programmed into the transponder. For example, the information could include the date the bracelet is issued, the date the bracelet expires and will not longer be usable for access, the age status of the wearer, and whether the bracelet can be used for purchasing goods or services. Any other desired information, depending on the context in which the bracelet is to be used, may be pre-stored or pre-programmed in the transponder. The signal may also be used to access information stored in a database The transponder 32 is electrically connected to and derives power, in known fashion, from a loop antenna in the form of a continuous electrically conductive loop 34 that extends from the transponder and forms an electrically conductive continuous path along substantially the entire length of the band 12 of bracelet 10. Consideration should be given to the distance between the sections of the loop antenna that form loop 34 in order to minimize inductance that can lead to possible interference with the operation of the circuit. Loop 34 is preferably, but not necessarily, made from printed conductive ink that is robust enough to withstand normal handling but fragile enough that it will be broken if a user attempts to remove the bracelet. Alternatively, loop 34 may be a thin wire such as copper wire, a thin foil, or other suitable electrically conductive material that will form an electrically continuous path but will break as a result of tampering. Forming loop 34 with frangible zones, where stresses from tampering attempts are most likely to occur, may facilitate breakage of the conductor. Of course, if the user attempts to remove the bracelet 10 with a cutting implement, the conductor forming loop 34 will also be severed as band 12 is severed.

It will be appreciated that, if the loop 34 is broken and the continuity of the electrical path defined by loop 34 is broken, transponder 32 will be rendered inoperative and the bracelet 10 rendered unusable. Preferably, although not necessarily, loop 34 runs closely around the barbed peg 20 and the locking hole 22 of locking mechanism 18 and also closely around each adjustment hole 24. This prevents a user from making a small incision in the band 12 near an adjustment hole 24 or near locking mechanism 18, and sliding the barb 20 out of the bracelet 10 without also severing loop 34. Bracelet 10 may also be fitted with an adhesive pad 36 to hold the excess band in a tight loop around the wearer's limb. Although this is not necessary for the bracelet to function, it is a necessary alternative to cutting and removing the excess bracelet, which is standard practice in many cases.

Figure 2:
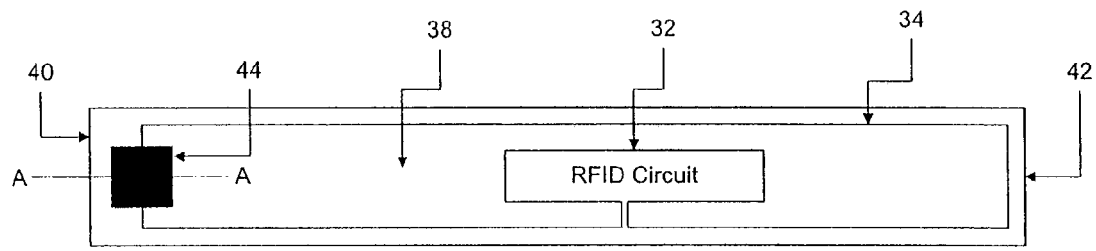
FIG. 2 is a schematic representation of another embodiment of the present invention.
Figure 2A:
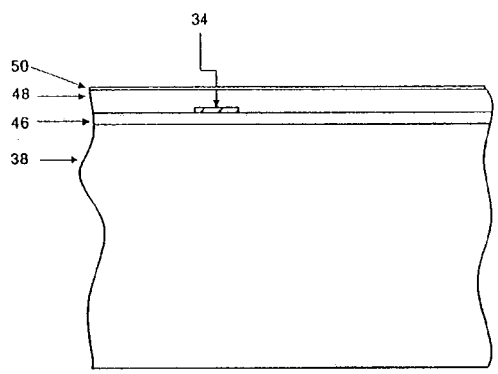
FIG. 2A is an enlarged sectional view taken along line A—A of FIG. 2

FIGS. 2 and 2A show an alternative embodiment for a bracelet 38 that uses an adhesive to fasten opposite ends, 40 and 42, of the bracelet together. As in the first embodiment, the bracelet 38 comprises a wire loop 34 that runs all the way along the length of the bracelet 38. However, in this embodiment, the loop 34 runs through an adhesive patch 44 attached to one side of the bracelet 38 at a first end 40. The opposite ends 40, 42 of the band can be brought together in overlapping fashion and joined by pressing the adhesive patch 44 against the other end of the bracelet. The adhesive patch 44 has two different adhesives. A first adhesive 46 is initially in contact with one side of the bracelet 38. A portion of loop 34 is passed between first adhesive 46 and a second adhesive 48, which overlies adhesive 46 and makes contact with the opposite side of bracelet 38 at end 42 when the ends are brought together. Adhesive 46 can be weaker either in formula or in quantity than the adhesive 48 which makes contact with the opposite side of bracelet 38. The strength of the bond between the two adhesives 46 and 48 is selected to be greater than the bond between adhesive 46 and bracelet 38. The different adhesive strengths ensures that upon removal, the adhesive patch originally attached to end 40 of the bracelet 38 will remain attached to end 42 of bracelet 38, but will separate from end 40, thereby severing the portion of the conductor that is contained within the adhesive patch from the rest of conductive loop 34. As with the previously described embodiment, conductor 34 can be provided with frangible areas to facilitate breaking. The adhesive patch 44 can be covered with a non-stick releasable seal 50 until it is time to secure the bracelet 38 to the wearer.

In a variation of this embodiment, the adhesive patch 44 can be made from a single adhesive. In that variation the conductor forming loop 34 must still run through or over the adhesive. The adhesive must necessarily be designed such that it will remain attached to the opposite end of the band 38 when any attempt to peel the band apart is made. That way, attempts to peel apart the adhesive will necessarily cause the conductor to break.

Once the bracelet 38 is attached by overlapping the ends 40, 42 and pressing the adhesive patch against the opposite end of the bracelet, it cannot be removed without breaking the loop 34 and thus disabling the transponder 32. If the user attempts to pull off the bracelet 38, as the user pulls the two ends 40, 42 of the bracelet 38 apart the conductor forming loop 34 and completing the electrical circuit to transponder 32 will break, rendering the bracelet 38 non-operational.

Figure 3:
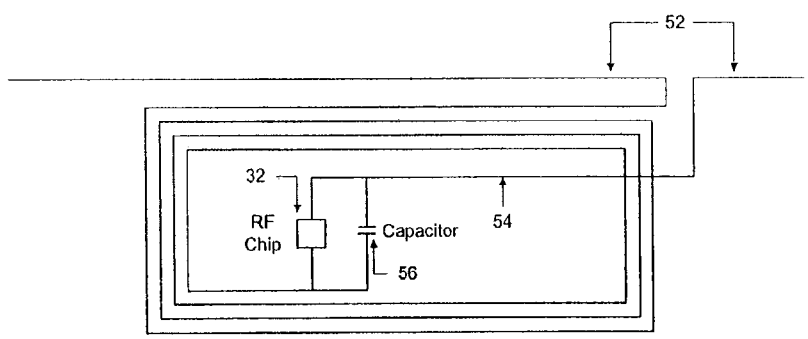
FIG. 3 is a schematic representation of a transponder circuit for use in the present invention.

FIG. 3 shows a modification of a transponder circuit used in the present invention. Transponder chip 32 typically has associated with it a capacitor 56 which acts as a power supply. The modification involves extending a wire 54 that connects capacitor 56 and transponder chip 32 to the beginning of the wire loop 52 so that it runs along the length of the bracelet. This point of connection is ideal for a wire etched RFID antenna because it requires minimum modification of the circuit. This is also an ideal connection point because it requires only one wire to cross over the antenna. Such minimal modification clearly is advantageous because it facilitates manufacture.

In operation, one uses the bracelet in the same manner in which conventional RFID bracelets are used. The bracelet is attached to the wrist or other body part of a user and then, when unique identification is necessary, the user must bring the bracelet within a certain distance of an RFID reader, which transmits a wireless signal. When within that distance, the transponder 32 will be powered by the wireless signal from the RFID reader and, in response, transmit to the RFID reader its own wireless signal representative of the unique information pre-stored or pre-programmed in the transponder. The reader may be linked to a microprocessor having a database of relevant information pertaining to the unique bracelet identification. If the bracelet of the present invention is used in a nightclub setting, for example, the information encoded may include: age to allow access to age-restricted areas, debit account balance for payment of food and drink, and identification of the patron's favorite drink to facilitate placing orders in loud, crowded areas. Another example of an application of the bracelet of the present invention is in a hospital setting. The RFID reader may be interfaced with a database of hospital records that would not otherwise be readily available. A physician may require, for example, family medical history records or a listing of previous medications that may have an influence on the immediate diagnosis. Such information is usually found at a patient's family doctor and is not always readily available. The database may also include a photo of the patient for positive identification and to reduce the possibility of human error.

The present invention may be embodied in other specific forms without departing from the spirit thereof and, accordingly, reference should be made to the appended claims, rather than to the foregoing specification, as indicating the scope of the invention.

Although two embodiments of the identification device have been described and shown in the drawings, those skilled in the art will understand how features from the two embodiments may be combined and interchanged.

The invention claimed is:

1. An identification device comprising:
   a band;
   a non-reusable tamper-resistant fastening arranged to join opposite end regions of said band to fasten it around a body part of a user;
   a transponder circuit attached to said band, the transponder circuit being responsive to a received wireless signal, and in response to said received wireless signal, emitting a wireless signal representative of information pre-stored in the transponder;
   an electrically conductive continuous loop on said band extending from said transponder and forming an electrically continuous path along substantially the entire length of said band, said loop being frangible and easily broken in response to an attempt to remove the band from the wearer's body part;
   circuitry in said transponder electrically connected to said loop and arranged to become inoperative and disable said transponder if said loop is broken; and
   wherein said non-reusable tamper-resistant fastening comprises a hole in one end of said band and a barbed peg on the other end of said band, the barbed peg arranged to pass through said hole and lock into a mating hole shaped to resist removal from said hole, and wherein said frangible loop closely encircles said hole.

2. The identification device of claim 1, further comprising a plurality of said holes such that said identification device may be snugly fitted to a wearer's limb by snapping said peg into a selected one of said holes, and wherein said frangible loop closely encircles each of said holes.

3. The identification device of claim 2, further comprising a portion of said frangible loop closely encircling said peg.

4. A device comprising:
   a band;
   a non-reusable tamper-resistant fastening arranged to fasten said band around a body part of a user;
   a transponder circuit attached to said band, the transponder circuit being responsive to a received wireless signal, and in response to said received wireless signal, transmitting a transmitted wireless signal representative of information pre-stored in the transponder circuit;
   an antenna, cooperating with said transponder circuit for receiving and transmitting the received and transmitted wireless signals;
   an electrically conductive loop forming an electrically continuous path along substantially the entire length of said band, said electrically conductive loop also providing an electrical connection between said transponder circuit and said antenna such that said transponder circuit is unable to receive the received wireless signal or unable to transmit the transmitted wireless signal if said loop is broken; and
   a plurality of adjustment holes disposed along a portion of the band such that said identification device may be snugly fitted to a user's body part by inserting said peg through a selected one of said adjustment holes, and wherein said electrically conductive loop substantially surrounds at least one of said adjustment holes.

5. The device of claim 4, further comprising a portion of said electrically conductive loop substantially surrounding said peg.

6. An identification device, comprising:
a band having a first end region and second end region and a middle region located between said two end regions;
a non-reusable tamper-resistant fastening arranged to join said first and second end regions of said band to fasten it around a body part of a user;
a transponder circuit attached to said band in said middle region, the transponder circuit being responsive to a received wireless signal and in response to said received wireless signal emitting a wireless signal representative of information pre-stored in the transponder circuit;
an antenna, formed as a coil of conductive material surrounding said transponder circuit, and cooperating with said transponder circuit to receive and emit wireless signals;
an electrically conductive continuous loop on said band extending from said transponder circuit and said antenna and forming an electrically continuous path along substantially the entire length of said band, running to a point adjacent both said first end of said band and to said second end of said band, said loop being frangible and easily broken in response to an attempt to remove the band from the user's body part;
circuitry in said transponder circuit electrically coupled to said continuous loop and arranged to become inoperative and disable said transponder circuit if said loop is broken; and
wherein said non-reusable tamper-resistant fastening comprises an adjustment hole in one portion of said band and a barbed peg on another portion of said band, the barbed peg arranged to pass through said adjustment hole and lock into a locking hole, the barbed peg shaped to resist removal from said locking hole, and wherein said frangible loop substantially surrounds said adjustment hole.

7. The identification device of claim 6, further comprising a plurality of said adjustment holes such that said identification device may be snugly fitted to the user's body part by inserting said peg into a selected one of said adjustment holes.

8. The identification device of claim 7, further comprising a portion of said frangible loop substantially surrounding said peg.

9. An identification device, comprising:
a band;
a non-reusable tamper-resistant fastening arranged to join opposite end regions of said band around a body part of a user, the fastening further comprising a barbed peg and a locking hole located on one end of said band, and an adjustment hole located in another portion of said band, the barbed peg arranged to be inserted through said adjustment hole and engage said locking hole;
a transponder circuit attached to said band, the transponder circuit being responsive to a received wireless signal and in response to said received wireless signal emitting a wireless signal representative of information pre-stored in the transponder circuit;
an electrically conductive frangible loop on said band extending from said transponder circuit and forming an electrically continuous path along substantially the entire length of said band, said loop being easily broken in response to an attempt to remove the band from the wearer's body part, and wherein said loop substantially surrounds said adjustment hole; and
said transponder circuit electrically connected to said loop and arranged to become inoperative and disable said transponder circuit if said loop is broken.

10. The identification device of claim 9 wherein said non-reusable tamper resistant fastening comprises a plurality of adjustment holes spaced along a portion of said band.

11. The identification device of claim 10 wherein said frangible loop substantially surrounds said plurality of adjustment holes.

12. The identification device of claim 9 wherein said frangible loop substantially surrounds said peg.

13. The identification device of claim 9 wherein said frangible loop substantially surrounds said locking hole.

* * * * *